April 3, 1945.  E. F. ALLEN  2,373,001

VALVE BONNET STRUCTURE

Filed Dec. 7, 1942  2 Sheets-Sheet 2

Inventor
Earle F. Allen
by Roberts Cushman & Woodbury
Attys.

Patented Apr. 3, 1945

2,373,001

UNITED STATES PATENT OFFICE 2,373,001

VALVE BONNET STRUCTURE

Earle F. Allen, New York, N. Y., assignor to Manning, Maxwell & Moore, Incorporated, New York, N. Y., a corporation of New Jersey Application December 7, 1942, Serial No. 468,065

3 Claims. (Cl. 251—49)

This invention pertains to valves such as are employed for controlling the flow of fluid through pipes or conduits, and relates more particularly to an improved valve bonnet structure.

The principal object of the present invention is to provide an improved bonnet structure for valves, affording an adequate guide for a valve stem, insuring against leakage even at high pressure, and so designed as to permit replacement of the stem packing with a minimum of difficulty.

Other and further objects and advantages of the invention will be pointed out hereinafter in the following more detailed description and by reference to the accompanying drawings in which Fig. 1 is a vertical section partly in elevation on the diametrical plane of the inlet and outlet passages of the valve casing showing the invention embodied in a gate type valve;

Figure 1:
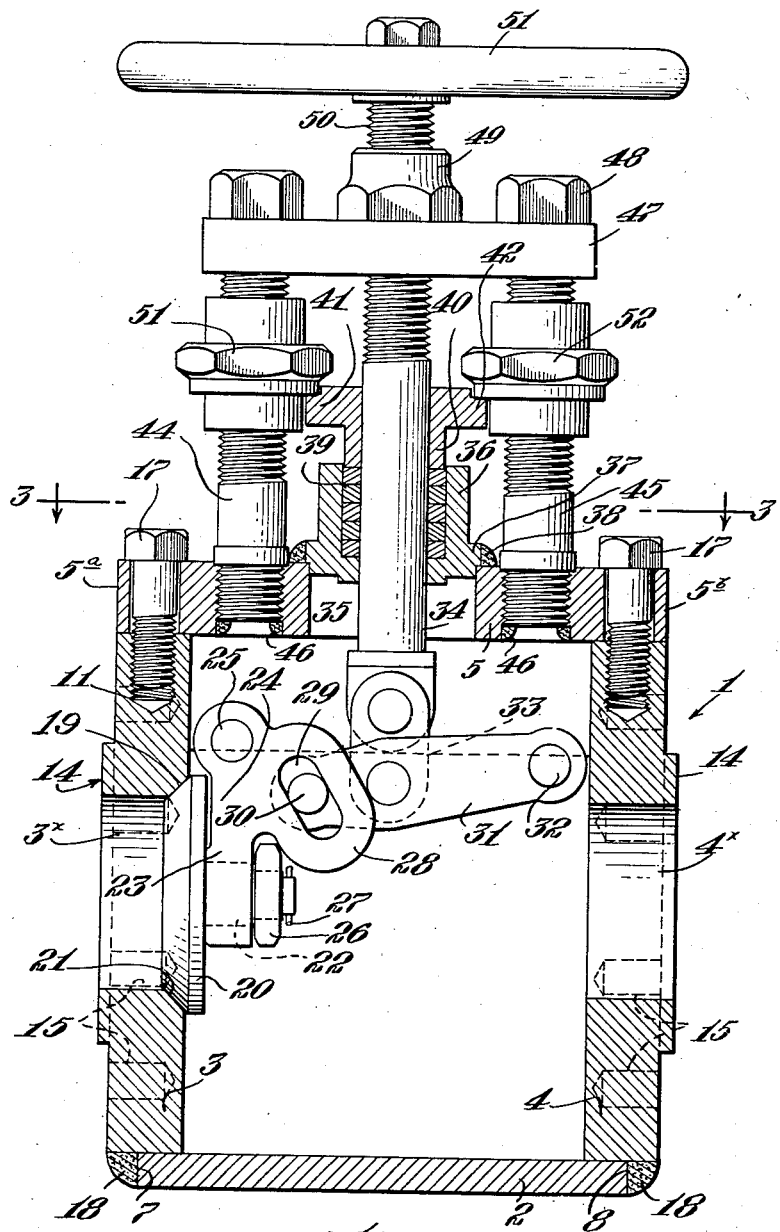
Figure 3:
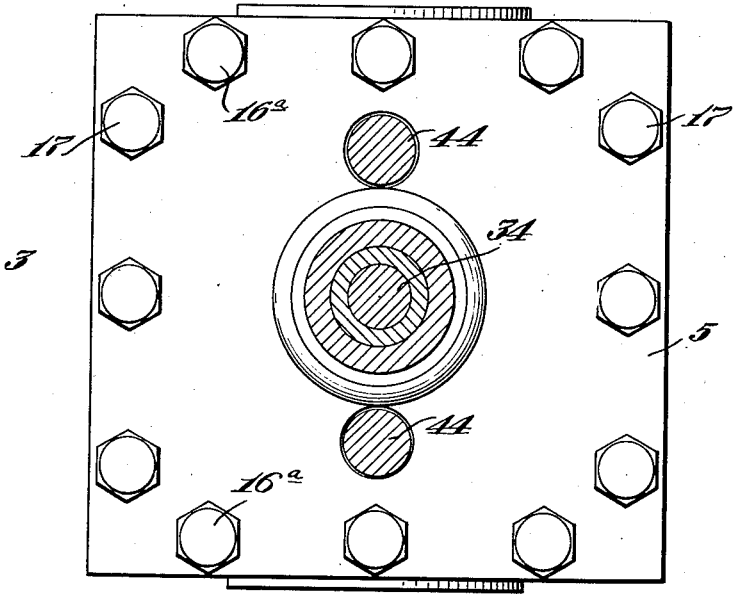
Fig. 3 is a horizontal section substantially on the line 3—3 of Fig. 1.

Referring to the drawings, the numeral 1 designates a valve of gate type embodying the present invention. The casing of this valve is of substantially D-shape in a plane perpendicular to the axis of the valve seat (Fig. 2) and comprises a unitary wall member 2 of substantially U-shape consisting of a length of sheet metal bent on a circular arc to form a curved bottom wall and having the substantially parallel leg members 2ª and 2ᵇ designed to form the opposite side walls of the valve casing. The casing also comprises the end members 3 and 4 which may likewise be made of sheet metal but preferably considerably thicker than the wall member 2. These end members 3 and 4 are so shaped that they may be fitted within the U-shaped side wall member 2 so as when assembled therewith to occupy the relative positions shown in Fig. 1, whereupon they are permanently united to the edges 7 and 8 of the side wall member 2 by welding metal indicated at 18 (Fig. 1). The casing also comprises the top member or bonnet support 5 which is likewise of sheet metal of approximately the thickness of the end members 3 and 4, and which is of substantially rectangular contour, having the substantially straight opposite edges 5ª and 5ᵇ which are spaced apart a distance substantially equal to the distance between the outer surfaces of the leg members 2ª and 2ᵇ of the U-shaped part 2. The part 2 is preferably thickened toward its upper edges by means of block 9 and 10, respectively, of metal welded to the inner surfaces of the legs 2ª and 2ᵇ. In the outer edges of these thickened portions of the part 2 there are formed tapped sockets 11, which are designed to receive bolts 17 by means of which the member 5 is removably secured to the side wall member 2. The member 5 also has opposite straight edges which are spaced apart a distance substantially equal to the distance between the outer surfaces of the assembled members 3 and 4. Openings are formed along these edges of this top member for the reception of bolts 16ª which enter tapped sockets provided in the upper edges of the end members 3 and 4.

The end members 3 and 4 are furnished with fluid flow apertures or ports 3ˣ and 4ˣ, respectively, one of which may be an inlet passage and the other a delivery passage, both communicating with the valve chamber defined by the parts 2, 3, 4 and 5. The members 3 and 4 are provided with finished outer surfaces surrounding the openings 3ˣ and 4ˣ, respectively, such surfaces preferably constituting the outer faces of annular low bosses 14 designed to make leak-tight contact with other parts with which the valve may be associated, for example, with pipe flanges or with flanges or surfaces of fluid containers such, for instance, as a steam generator or the like. The inner surface of the part 3, as illustrated in Fig. 1, is beveled to provide an annular valve seat 19 with which cooperates a valve head or feather 20 having a beveled face 21 for engagement with the seat. This valve head is furnished with a stem 22 which passes through an opening in the arm 23 of a bell crank lever 24 which is pivoted at 25 within the valve chamber. The valve stem may be secured to the arm 23 by means of a nut 26 and cotter pin 27 or by any other suitable means of attachment. The lever 24 is furnished with a second arm 28 having an inclined slot 29 which receives a crank pin 30 projecting from lever 31 pivoted at 32 within the valve chamber. This lever 31 is connected at a point intermediate its ends, by means of a link 33, to the lower end of the valve stem 34. This valve stem extends up through a large central opening 35 in the member 5 and through a stuffing box 36. The stuffing box has a flange 37 which is welded leaktight at 38 to the member 5. Surrounding the stem 34, within the stuffing box, is a body of compressible packing material 39 which is normally held under compression by means of a gland 40. This gland is provided with a pair of oppositely directed ears 41 and 42 which are normally engaged by nuts 51 and 52 respectively, having threaded engagement with a pair of parallel posts 44 and 45, whose lower ends are screwed into threaded bores in the member 5 and are preferably welded at 46 (Fig. 1) to the member 5. Near their upper ends the posts 44 and 45 carry a bridge member 47 which is held in place by means of nuts 48 at the upper ends of the posts. This bridge member has a central, internally screw-threaded boss or stem-bearing 49 which engages screw threads 50 on the upper portion of the stem 34, the latter having an actuating wheel or handle 51 by means of which it may be turned. Turning the stem 34 swings the lever 31 and by means of the pin 30 and slotted arm 28 moves the valve head 20 toward and from the seat 19. When in fully open position the valve head 20 is elevated to such a point within the valve chamber that it does not seriously interfere with the free flow of fluid entering, for example, through the passage $4^x$ and leaving through the delivery opening $3^x$ so that the valve thus constructed constitutes a satisfactory gate valve.

The packing in the stuffing box 36 is of substantial length so as to insure adequate packing of the valve stem, even though the valve be subjected to extremely high pressures. The packing may be compressed by turning the nuts 51 and 52, but if it be desired to retract the packing gland from the stuffing box, it is merely necessary to loosen the nuts 51 and 52 slightly so that the gland may be turned angularly sufficiently to disengage its ears 41 and 42 from the nuts, whereupon the gland may be moved freely upwardly out of the stuffing box without necessitating a long retraction of the nuts relative to the posts 44 and 45.

Figure 2:
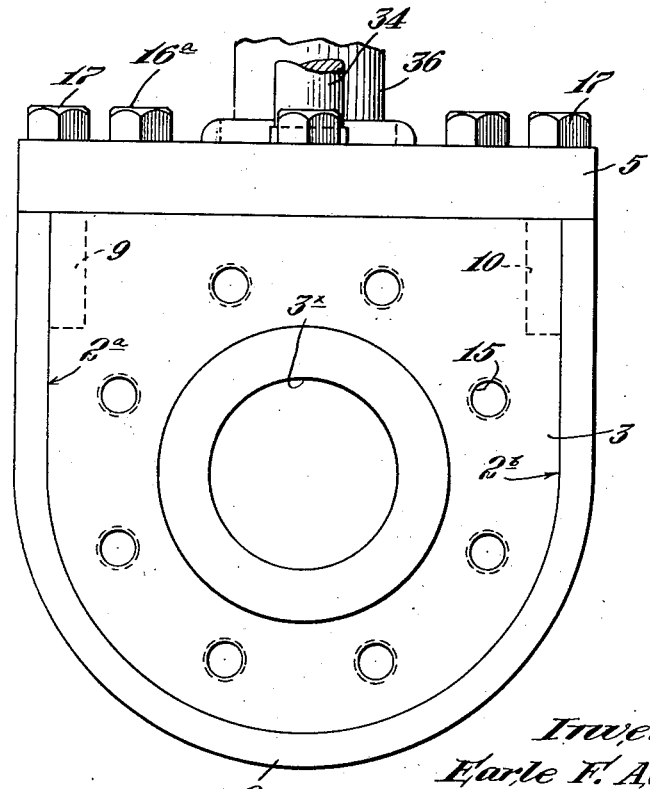
Fig. 2 is a fragmentary end elevation of the valve of Fig. 1.

As illustrated in Figs. 1 and 2, the end members 3 and 4 are preferably provided with series of tapped sockets 15 arranged in a circle concentric with the openings $3^x$ and $4^x$, respectively, such circle being of a radius less than the radius of the curved edges $3^a$ of the parts 3 and 4. These tapped sockets 15 are designed for the reception of bolts or equivalent fasteners by means of which the casing is secured to other parts, for example to pipe flanges.

While the improved bonnet structure comprising the member 5 and the parts carried thereby has here been illustrated by way of example, as forming a part of a valve casing of novel and useful design, it is to be understood that this new bonnet structure is not limited in its applicability to a valve or valve casing of the specific structure herein disclosed, but is of general utility in valves having packed stems. It is further to be understood that the invention is not necessarily limited to the precise details herein specifically disclosed but is to be regarded as broadly inclusive of any and all modifications falling within the scope of the appended claims.

I claim:

1. A valve comprising a bonnet support having an opening for the passage of a valve stem, a pair of posts permanently welded to the bonnet support at diametrically opposite sides of the opening, a bridge member normally fixed to the posts, said bridge member carrying an internally screw-threaded stem-bearing, a stem having threaded engagement with the bearing and extending through the opening in the support, a stuffing box carried by the support between the posts, a packing gland cooperable with the stuffing box to compress packing within the latter, and a pair of nuts having threaded engagement with the respective posts, the gland having diametrically opposite integral rigid ears, the ears being too short to engage the posts but being long enough for normal engagement by the respective nuts whereby the gland may be forced into the stuffing box by turning the nuts, the gland being rotatable to permit the ears to be disengaged from the nuts at will thereby to allow the gland to be withdrawn freely out from the stuffing box.

2. A valve comprising a bonnet support having an opening for the passage of the valve stem, a pair of posts rigidly secured to the bonnet support at diametrically opposite sides of the opening, a bridge member normally fixed to the posts, said bridge member carrying an internally screw-threaded stem-bearing, a stem having threaded engagement with the bearing and extending through the opening in the support, a stuffing box mounted on the support between the posts, a packing gland cooperable with the stuffing box to compress packing within the latter, and a pair of nuts having threaded engagement with the respective posts, the gland having a pair of diametrically opposite ears normally positioned to be engaged by the respective nuts, whereby the gland may be forced into the stuffing box, the gland being rotatable to permit said ears to be disengaged from the nuts at will, thereby to allow the gland to be moved freely out from the stuffing box.

3. A valve device having a casing providing a chamber, the casing also including a part defining a stuffing box for the reception of packing and through which the valve actuating stem passes, a valve actuating stem passing through the stuffing box into said chamber, means for turning the valve stem, a pair of parallel posts disposed respectively at diametrically opposite sides of the axis of the stuffing box, one end of each post being welded rigidly to the casing, a bridge member normally fixed to the posts and spaced axially of the stem from that part of the casing which defines the stuffing box, said bridge member carrying an internally screw-threaded stem-bearing, the valve actuating stem having threaded engagement with said stem-bearing, a packing gland cooperable with the stuffing box to compress packing within the latter end, the packing gland being of an external diameter such as to clear the posts, a pair of nuts having threaded engagement with the respective posts, the packing gland having diametrically opposite integral rigid ears, the ears being too short to engage the posts but being long enough for normal engagement by the respective nuts whereby the gland may be forced into the stuffing box by turning the nuts, the gland being rotatable to permit said ears to be disengaged from the nuts at will, thereby to allow the gland to be moved freely out of the stuffing box axially of the valve stem.

EARLE F. ALLEN.